2,917,475

COMPOSITION COMPRISING METHYL CELLULOSE, RESIN BINDER, AMINE SALT AND ORGANIC SOLVENT AND METHOD OF PREPARING OIL-IN-WATER EMULSION THEREFROM

Anna F. Melchoni, Paterson, Joyce L. Johnson, Fair Lawn, and Vernon L. Chase, Lake Arcadia, N.J., assignors to Interchemical Corporation, New York, N.Y., a corporation of Ohio No Drawing. Application July 27, 1956
Serial No. 600,375

2 Claims. (Cl. 260—15)

The present invention relates to oil-in-water type emulsions and aims to provide novel compositions that are especially useful in preparing oil-in-water type emulsions.

In recent years the printing of textiles with pigmented oil-in-water emulsion print pastes has become increasingly important. This method of printing with pigments is particularly attractive to textile printers because of the ease of clean up of equipment. Oil-in-water emulsions can be thickened to printing paste consistency by increasing the amount of volatile solvent but this is undesirable because of costs and fire hazards. As a result the thickening of oil-in-water print pastes is largely effected by use of water thickeners. Many different thickeners have been used with some success, but methyl cellulose has probably been used more than any other thickener. Other thickeners include gum tragacanth, ammonium polyacrylate, sodium polyacrylate, starch, modified starches and other water-soluble cellulose esters and ethers. Although the present invention is concerned primarily with oil-in-water emulsions in which methyl cellulose is used as a thickener of the aqueous phase of the emulsion, it is of value in preparing such emulsions using any of the water thickeners.

According to prior art technique for preparing oil-in-water emulsions containing methyl cellulose as a water thickener, it is recommended that methyl cellulose be dissolved in water by first mixing it with hot water, in which it is insoluble, and allowing it to soak for twenty to thirty minutes before diluting to desired concentration with cold water or preferably ice. Further cooling is recommended for maximum clarity. Such a technique is time consuming and expensive. In addition, it is undesirable where suppliers of textile printing color concentrates and clear concentrates wish to include methyl cellulose in their concentrates because it requires that large quantities of water be mixed with the concentrates which, of course, means that the concentrates can not carry as much color, binder, anti-crocking agent, and other desirable additive. All of this means that the textile printer pays more for the color that is applied to the cloth because he has to pay the transportation costs for the large quantities of water necessary to dissolve the methyl cellulose.

The present invention overcomes the above difficulties by making it possible to include methyl cellulose in a concentrate clear vehicle which can be easily diluted and mixed with color by the textile printer without the need for heating hot water or ice, and without any loss in the thickening capacity of the methyl cellulose. In accordance with the invention, methyl cellulose in powder form, is dispersed in a synthetic resin solution in volatile water-immiscible organic solvent along with sodium lauryl sulfate and an amine salt of a fatty oil acid, to form a concentrate containing 10 to 25% by weight of methyl cellulose, 5 to 25% of an organic solvent soluble binder resin, 0.6 to 1.2 parts of sodium lauryl sulfate for each part of methyl cellulose, 1 to 5% by weight of an amine salt of a fatty oil acid and the remainder being volatile, water-immiscible organic solvent or solvent and water in an amount not exceeding about 5% by weight. Such concentrate vehicles are readily dilutable with water and volatile water-immiscible solvent to give oil-in-water emulsion printing vehicle having methyl cellulose dissolved in the aqueous phase.

In the practice of the invention, we prefer to use a high viscosity grade of methyl cellulose. By "high viscosity" we mean a viscosity of 1500 centipoises, or above, when measured on a 2% aqueous solution at 20° C. A "1500 centipoise" grade of methyl cellulose as sold in commerce means that it has a viscosity of 1500 when measured on a 2% aqueous solution at 20° C.

Organic solvent soluble resins that can be used are drying oil modified alkyd resins and thermosetting melamine-formaldehyde resin. The alkyd resins are preferably those of short to medium oil length, e.g. about 25 to 60% fatty oil modified.

The following examples in which the parts are by weight will further illustrate the invention.

Example 1

A concentrate clear is prepared by thoroughly mixing 3.7 parts of 7000 centipoise methyl cellulose, 5.3 parts of a 30% aqueous solution of trihydroxymethylamino methane stearate, and 10.6 parts of sodium lauryl sulfate with a solution of 14.6 parts of organic solvent soluble melamine formaldehyde resin dissolved in 9.7 parts of turpentine and 46.7 parts of Varsol No. 2. This concentrate is used for making printing vehicles by mixing 0.5 to 5.0 parts of the concentrate with 40 to 60 parts of water with stirring and then emulsifying enough Varsol No. 2 or other suitable water-immiscible, solvent into the mixture to make 100 parts. A typical ratio would be 2.2 parts of concentrate, 45 parts water and 52 parts of Varsol No. 2 (hydrocarbon solvent, boiling range 322 to 404° F., kauri-butanol value 44). This produces a smooth vehicle that has good printing properties.

Example 2

A concentrate clear vehicle is prepared in a manner similar to Example 1 from:

| | |
|---|---|
| Oil modified alkyd resin | 10.0 |
| Trihydroxymethylamino methane stearate | 3.0 |
| Sodium lauryl sulfate | 18.8 |
| 4000 centipoise grade of methyl cellulose | 25.0 |
| Varsol No. 2 | 43.2 |

This concentrate mixes readily without heating to give a smooth fluid paste. A "cut" vehicle prepared from 2.4 parts of the concentrate 55.6 parts of water and 42 parts of Varsol No. 2 gives a very heavy bodied printing vehicle, i.e. the viscosity is relatively high. The body of the printing vehicle can be varied by changing the ratio of water to volatile, water-immiscible solvent and concentrate. For instance, a vehicle made by mixing 1.7 parts of the above concentrate with 68.3 parts of water and 30 parts of Varsol No. 2 gives a vehicle of good average viscosity, or body, for printing.

Example 3

A concentrate clear is prepared in a manner similar to Example 1 from the following:

| | |
|---|---|
| Organic solvent soluble butylated melamine formaldehyde resin | 41.7 |
| Sodium lauryl sulfate | 7.5 |
| Triethanolamine stearate | 5.0 |
| 1500 centipoise grade of methyl cellulose | 10.0 |
| Varsol No. 2 | 35.8 |
| | 100.0 |

A cut clear, or printing vehicle, is obtained by mixing 6 parts of this concentrate with 42 parts of water and 52 parts of Varsol No. 2.

We claim:

1. A composition for use in making pigmented oil-in-water type emulsion printing pastes for printing on textiles, said composition comprising water, the amount of water not exceeding about 5% by weight, 10 to 25% by weight methyl cellulose having a viscosity of at least 4000 cps. in 2% solution in water at 20° C., 5 to 25% by weight organic solvent soluble binder resin of the class consisting of drying oil modified alkyd resin and thermosetting melamine-formaldehyde resin, 0.6 to 1.2 parts by weight of sodium lauryl sulfate for each part of methyl cellulose, 1 to 5% by weight of a fatty oil acid salt of a water-soluble acyclic polyhydroxy amine containing no more than six carbon atoms and volatile, water-immiscible petroleum-derived hydrocarbon solvent to make a total of 100 parts.

2. The method of making an oil-in-water emulsion which consists in (1) adding 0.5 to 5.0 parts of a composition as claimed in claim 1 to 40 to 60 parts of water with stirring, and (2) emulsifying enough volatile, water-immiscible petroleum-derived hydrocarbon solvent into the mixture to make a total of 100 parts.

References Cited in the file of this patent

UNITED STATES PATENTS

| | | |
|---|---|---|
| 2,494,810 | Hobday et al. | Jan. 17, 1950 |
| 2,631,985 | Mullin | Mar. 17, 1953 |
| 2,637,705 | Auer | May 5, 1953 |
| 2,681,322 | Auer | June 15, 1954 |